Dec. 29, 1964 K. W. McLOAD 3,163,703
MOUNTING FOR ELECTRICAL SENSING DEVICES ON CABLES
Filed June 11, 1962
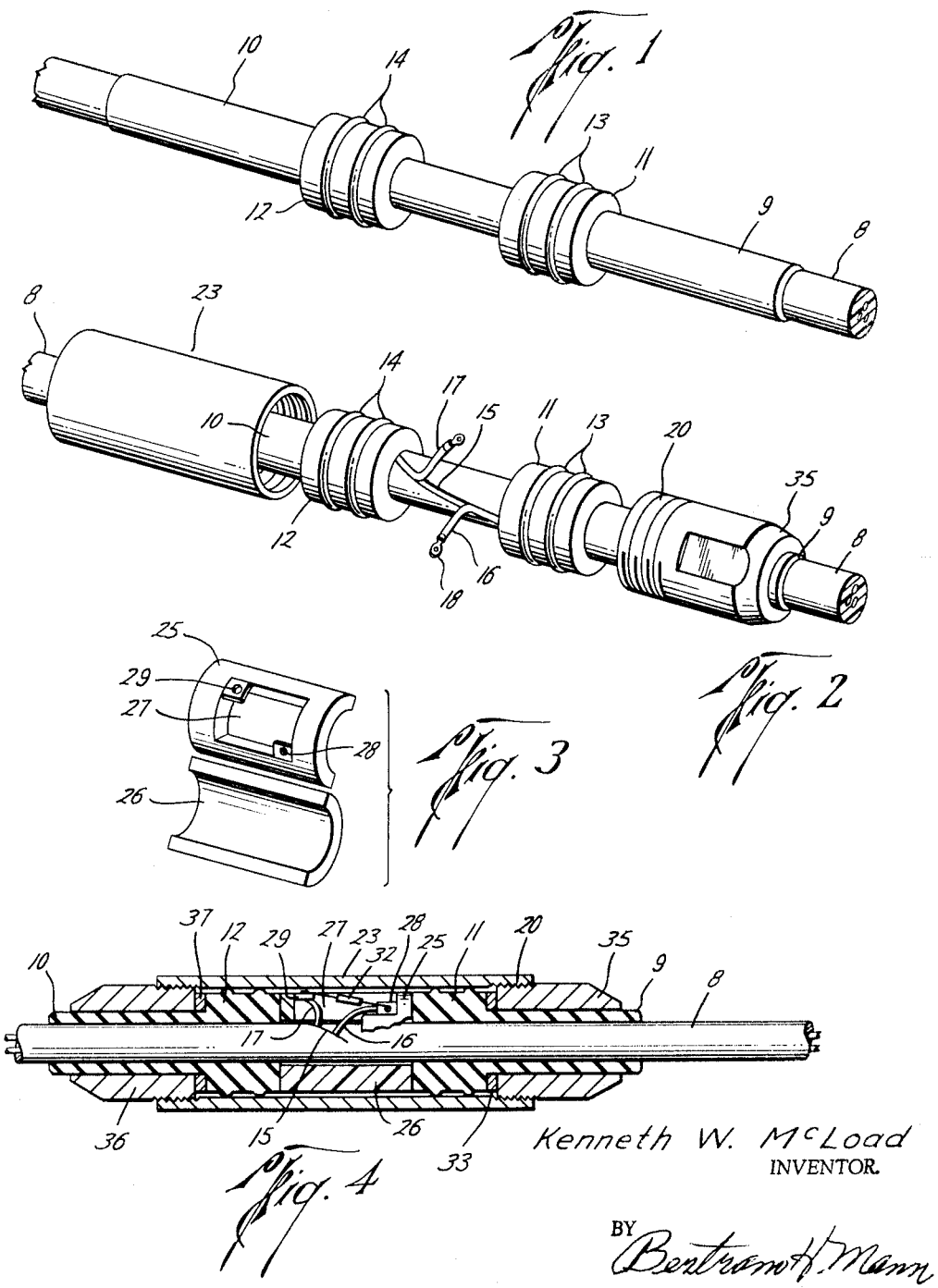
Kenneth W. McLoad
INVENTOR.
BY Bertram H. Mann
ATTORNEY

3,163,703
MOUNTING FOR ELECTRICAL SENSING DEVICES ON CABLES

Kenneth W. McLoad, Houston, Tex., assignor, by mesne assignments, to Vector Cable Company, Houston, Tex., a corporation of Texas
Filed June 11, 1962, Ser. No. 201,658
4 Claims. (Cl. 174—11)

This invention relates to mounts for sensing devices, such as temperature sensing devices, upon an electric cable.

It frequently is desired to locate one or more devices for sensing ambient conditions, such as temperature, upon an electric cable to obtain measurements of such conditions by electrical signals transmitted via the cable to a remote receiving or recording point. An example of such installation occurs in well bores where one or more temperature measuring instruments may be suspended by a cable within fluids in a well. Such instrumentation also has been utilized in measuring temperatures in the interior of glaciers. It is customary to attach a measuring instrument at one or more suitable points along an electric cable by a more or less permanent encasing material which is expected to protect the instrument from abrasive, chemical and other effects to which the instrument may be subjected so that the electrical response of the instrument is not affected. However, damage does occur and in such cases, removal and replacement of the sensing instrument can not be accomplished in the field. Furthermore, inspection or repair of the instrument in the field is not possible.

Accordingly, an object of the present invention is to provide means for conveniently and detachably mounting a sensing device such as a temperature dependent resistor (thermistor) or other heat measuring instrument upon an electrical cable.

Another object is to provide convenient means for mounting such a heat responsive instrument upon a cable, including means effectively protecting the instrument against mechanical and other adverse influences and facilitating inspection, repair or replacement thereof at the site of use.

The herein disclosed means for achieving the above results is comprised, generally, of a pair of collars spaced from one another and attached to a cable to either side of exposed, projecting conductor wire ends. A split sleeve of electrical insulating material, such as Bakelite or epoxy resin, is sized to fit over the cable and snugly between the collars. The split sleeve is provided with an opening through which the exposed conductor ends project and sized to accommodate a sensing instrument. The latter sleeve has terminals embedded therein to which the conductor ends and also the electrical connections for a sensing instrument are attached so as to electrically connect the instrument into the conductor. A protective casing is received over the collars and spans the space therebetween. The casing is internally threaded at its ends and is secured in position by threaded closure members received upon the cable outwardly of the collars. These closure members bear against the collars and distort the same radially into firm sealing contact with the protective casing.

In the accompanying drawings,

FIG. 1 is a perspective view of an electric cable having spaced collars secured thereto.

FIG. 2 is a view of the structure in FIG. 1, but showing ends of conductor wires projecting through the insulation of the cable between the collars and also illustrating the protective casing and one of the end closure members therefor in disassembled relationship.

FIG. 3 is a disassembled view showing the halves of the terminal-mounting insulating sleeve.

FIG. 4 is a longitudinal section through a cable with a mounting assembly and sensing device mounted therein.

FIG. 1 shows an insulated cable 8 with electrical insulating sheathing embedding one or more electrical wires. Received upon this cable are a pair of tubular sleeves 9 and 10, conveniently constructed of rubber, which are securely and sealingly attached to the sheathing of cable 8, as by the application of heat and/or pressure. At the adjacent inner ends of sleeves 9 and 10 are collars 11 and 12 having spaced peripheral sealing ridges 13 and 14, the collars being in spaced-apart facing relationship. The sleeves, collars, and ridges may be of integral molded construction, or built up of separate parts molded or otherwise secured together.

FIG. 2 shows the sheathing of cable 8, between collars 11 and 12, cut, as at 15, and the conductor wire ends 16 and 17 pulled therethrough. Ends 16 and 17 may be formed by severing a conductor in the cable. Each wire end is provided with a terminal eye 18 or 19. Slidably received on sleeve 9 is a cylindrically shaped closure member 20. A protective tubular casing 23 is shown positioned about the other sleeve 10 in FIG. 2. Closure member 20 and casing 23, preferably constructed of stainless steel, are shown in position to be assembled upon collars 11 and 12, as will be explained.

FIG. 3 shows the disassembled halves 25 and 26 constructed of Bakelite, epoxy resin, or like insulating material and which are shaped to snugly encompass the exposed cable sheathing between collars 11 and 12. Sleeve half 25 has a central cutout or opening 27 forming a space through which wire ends 16 and 17 may extend and for accommodating a sensing instrument. A pair of wire connecting terminals 28 and 29 are embedded in the material of sleeve half 25 at opposite corners of cutout space 27 thereof.

FIG. 4 shows in section the instrument mount on the cable. Wire ends 16 and 17 are shown connected to terminals 28 and 29, as are the electrical connections for a temperature responsive instrument 32, for instance, a thermistor. The instrument is received within cutout space 27 in insulator sleeve half 25. The two sleeve halves are secured together and snugly about conductor 8 by means of suitable glue, such as epoxy resin or the like. Protective tubular casing 23 is slid into centered position about collars 11 and 12 encompassing, of course, sleeve halves 25 and 26 and the instrument 32 and its electrical connections. Closure member 20 is threaded into the adjacent end of casing 23 and firmly lodged against a washer 33 which bears in turn against the right-hand end of collar 11. Member 20 has an extension 35 provided with wrench flats to facilitate interconnection with casing 23.

A second closure member 36, similar to member 20, is received upon molded sleeve 10 and threadedly secured to the opposite end of protective casing 23. A washer 37 is interposed between member 36 and left end of collar 12. Members 20 and 36, when interconnected properly with casing 23, bear firmly against collars 11 and 12 so as to distort these collars radially outwardly into sealing engagement with casing 23. Sleeves 9 and 10 projecting oppositely from collars 11 and 12 provide for firm fluid-tight sealing attachment of these parts to the sheathing on cable 8 and also protect the cable from abrasive action due to the tightening of closure members 20 and 36. If desired, space 27 provided for instrument 32 and its connections to wire ends 16 and 17 may be filled with a suitable plastic material, preferably non-setting, which stably positions the electrical parts. Such plastic material will seal the cut 15 in the covering or sheathing of conductor 8. However, the cut provided for the wire ends may be closed by tape or other means.

When it is desired to inspect, repair or replace instrument 32 or its electrical connections, it is simply necessary to unscrew one of the members 20 or 36 and withdraw tubular casing 23. Thereafter, the sensitive instrument may be easily removed from its connector terminals 28 and 29 and repaired or replaced, as desired. Thereafter, casing 23 and its closing members are reassembled to provide a sealed protective enclosure for the instrument.

The means illustrated may be utilized in affixing an electrical instrument to any type of insulated or sheathed cable. The form and materials of various elements may be modified as will occur to those skilled in the art, and the exclusive use of all modifications as come within the scope of the appended claims is contemplated.

I claim:

1. In an apparatus for attaching a sensing device to the ends of a conductor projecting from a continuous cable having a plurality of such conductors, the combination of means for attaching the sensing device to the projecting conductor ends, which means comprises, electrical insulating structure formed of a longitudinally divided tubular sleeve positioned about and spaced from said continuous cable, said insulating structure being further mounted on the cable on opposite sides of said conductor ends, and screw-type terminals mounted in said insulating structure for providing a conveniently detachable interconnection of said conductor ends and a sensing device.

2. A detachable mounting for providing a connection between a sensing device and cable conductor ends projecting laterally from a continuous cable comprising a pair of collar members for positioning on the cable in a spaced apart relationship; said collar members being made of a resilient material and having annular seal members formed on their outer surfaces; a split housing comprising two members for positioning about the continuous cable between said collars; one of said housing members having a cut-out portion formed therein for positioning over the laterally projecting conductor ends and for receiving the sensing device; screw-type terminal means formed on said one housing member adjacent said cut-out portion for providing a connecting terminal between the sensing device and the conductor ends; a rigid tubular casing sized to receive said collar members, said housing members and said terminal connections therein; and end members for reception within and detachable connection to the opposite ends of said casing to close said casing ends and compress said collars against said housing members and to expand said collar seal members on said collars into sealing engagement with said casing.

3. A cable construction comprising: a cable containing electrical conductors, collars constructed of resilient material secured in spaced apart relationship to said cable at a point thereon, a split collar constructed of a relatively rigid electrical insulation material formed into a pair of half-cylinder shaped portions and sized for mounting on said cable between said resilient collars such that an annular space is formed between said cable and said portions, said split collar having an access opening therein, temperature responsive means received in said access opening, said temperature responsive means being secured to conductor ends taken from said cable, a metal constructed enclosure for said collars including a tubular member snugly received over said resilient collars, and at least one threadedly connected end member closing said enclosure and providing a fluid tight seal between said resilient collars and tubular member and between said collars and said cable by compression of said resilient collars.

4. In a cable containing electrical conductors embedded in a sheath, a take-out device along the length of said cable including, electrical insulator means supported on the sheath of said cable, said insulator means being formed of a cylinder shaped portion divided into a plurality of segments which when fitted together form a sleeve about said cable which is sized to provide a space between said cable and said insulator means, an electrical sensing device, mechanically releasable electrical connector means on said insulator means adapted to provide a releasable mechanical connection between a cable conductor and said electrical sensing device, and means forming a fluid-tight chamber about said electrical insulator means and sensing device, said chamber forming means being constructed of parts which have releasable mechanical connections.

References Cited by the Examiner
UNITED STATES PATENTS

| 1,947,481 | 2/34 | Meyer | 174—22 |
| 1,984,355 | 12/34 | Abbott | 174—48 |
| 2,621,228 | 12/52 | Tompers | 174—93 |
| 2,626,299 | 1/53 | Richards | 174—77 X |
| 2,688,651 | 9/54 | Blake | 174—93 |
| 2,792,481 | 5/57 | Wood | 174—84 X |

JOHN F. BURNS, *Primary Examiner.*

JOHN P. WILDMAN, E. JAMES SAX, *Examiners.*